INVENTOR;
MARTIN M. BLUFSTON
BY
ATTORNEY

Jan. 9, 1945.　　　M. M. BLUFSTON　　　2,366,996
INTERNAL-COMBUSTION ENGINE OF OSCILLATING PISTON TYPE
Filed July 3, 1942　　　5 Sheets-Sheet 2

INVENTOR;
MARTIN M. BLUFSTON
BY *Robert B. Terry*
ATTORNEY

Jan. 9, 1945.                M. M. BLUFSTON                  2,366,996
              INTERNAL-COMBUSTION ENGINE OF OSCILLATING PISTON TYPE
                           Filed July 3, 1942          5 Sheets-Sheet 3

INVENTOR:
MARTIN M. BLUFSTON
BY Robert B. Terry
ATTORNEY

Jan. 9, 1945.  M. M. BLUFSTON  2,366,996
INTERNAL-COMBUSTION ENGINE OF OSCILLATING PISTON TYPE
Filed July 3, 1942  5 Sheets-Sheet 4

INVENTOR;
MARTIN M. BLUFSTON
BY Robert B. Terry
ATTORNEY

Jan. 9, 1945. M. M. BLUFSTON 2,366,996
INTERNAL-COMBUSTION ENGINE OF OSCILLATING PISTON TYPE
Filed July 3, 1942 5 Sheets—Sheet 5

FIG. 10.

INVENTOR;
MARTIN M. BLUFSTON
BY *Robert B. Terry*
ATTORNEY

Patented Jan. 9, 1945

2,366,996

UNITED STATES PATENT OFFICE 2,366,996

INTERNAL-COMBUSTION ENGINE OF OSCILLATING PISTON TYPE

Martin M. Blufston, St. Louis, Mo.

Application July 3, 1942, Serial No. 449,556

6 Claims. (Cl. 74—88)

This invention relates to internal combustion engines of oscillating piston type, and has particular reference to a multi-cylinder engine of this character, having the several cylinder units arranged radially about the engine power shaft, and wherein novel and effective gearing is employed to operatively connect the oscillating pistons to the engine shaft.

The principal object of the invention resides in the provision of an engine of the character indicated, wherein the power impulses of the cylinder units are imparted to the engine shaft by novel gear mechanism, thus avoiding heavy reciprocating parts common to engines of reciprocating piston type, and further wherein the improved arrangement includes cylinder units related in diametrically opposed pairs about the engine shaft, and according to one embodiment of the invention, separate gearing operatively connecting the oscillating pistons of each cylinder pair to the engine shaft. According to another embodiment of the invention, the novel gearing interconnecting the engine shaft and the several oscillating pistons, includes a single driven gear common to all of the cylinder units.

Another object is to provide a novel and effective gear drive mechanism between the oscillating pistons and the engine power shaft, for a multi-cylinder engine of the character indicated, wherein each of the cylinder units includes co-operating oscillating pistons or vanes operable about separate axes and oscillatable through a relatively wide angle, as of the order of 180 degrees, and wherein the pistons of each unit are operatively interconnected for synchronous oscillation.

Further objects and advantages of the present invention will appear readily from the following description of preferred embodiments thereof, as such are exemplified in the several figures of the accompanying drawings, wherein:

Referring to the drawings by suitable characters of reference, the numeral 10 designates generally, a preferred form of engine of the type indicated, having embodied therein the features of the present invention. According to the exemplary disclosure, the engine includes four cylinder units 11, 12, 14 and 15 which are arranged radially about and equally spaced from a central engine power shaft 16, each of these cylinder units by preference, being of four-cycle, double-acting character. The cylinder arrangement further is such that the units 11 and 12 are diametrically opposed, while the remaining units 14 and 15 are similarly related but displaced relative to the first pair by a quarter-turn or 90 degrees, as clearly appears in the drawings. An engine frame of any suitable construction is provided for supporting the cylinder units and engine shaft, and as herein shown by way of example only, such frame may include a central member 17 (Fig. 4) longitudinally bored to receive and journal therein the engine shaft 16, an engine mounting base 18 (Fig. 2) at one end of member 17; and cylinder supporting means as indicated in broken outline at 19 in Fig. 1 and shown in part by the member 19a, in Fig. 4.

Figure 3:
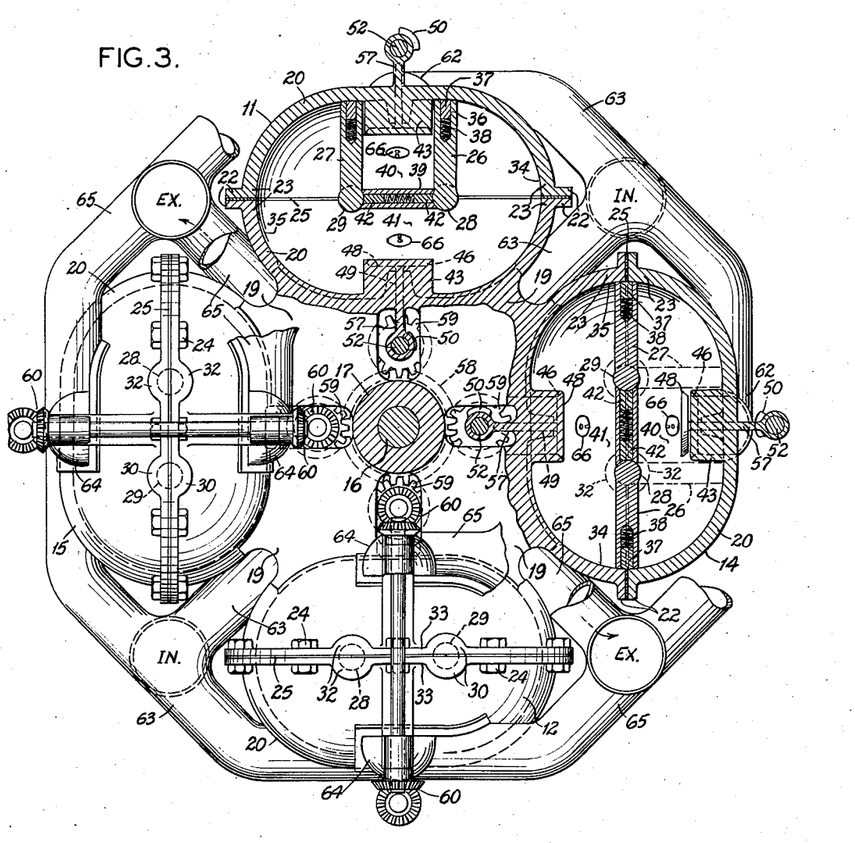
Fig. 3 is an end elevation similar to that of Fig. 1, but at the opposite end of the engine, with portions of the engine shown in section to illustrate the oscillating pistons in the cylinder units.
Figure 4:
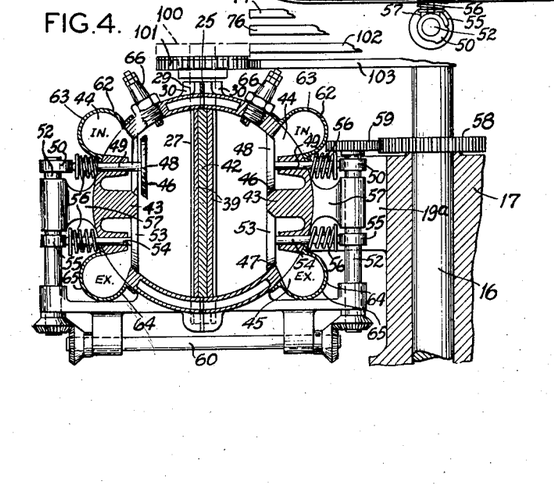
Fig. 4 is a sectional view transversely through one of the cylinder units, as taken from the line 4—4 in Fig. 1.

Apart from the piston drive connections to the engine shaft 16, the several cylinder units are identical in construction, hence a description of one thereof will suffice for the others as well, with like reference numerals designating the corresponding parts of the units. Referring particularly to Figs. 3 and 4, the cylinder unit comprises a generally circular cylinder structure formed by complementary cylinder shells 20 having external flanges 22 about the mating shell margins 23, through which the shells are secured in assembly as by bolting 24. A gasket indicated at 25, may be employed at the flange joint to effect a gas tight assembly. Arranged within the cylinder are a pair of pistons or vanes 26 and 27 which are oscillatable about separate, spaced axes, as the respective piston shafts 28 and 29 to which the associated pistons are secured. The cylinder which by preference is divided in the plane of the piston axes, has each of the shell-halves 20 formed to provide half-circular bearing seats 30 and 32 in the opposite portions 33 of the shell margin 23, the seats 30 cooperating in the cylinder assembly, to operatively journal the piston shaft 28, while the seats 32 cooperate similarly to journal the other piston shaft 29. The piston shafts are projected outwardly beyond one side of the cylinder for driving connection to the engine shaft 16, as will be hereinafter fully described.

Each of the pistons 26 and 27 is by preference, semi-circular in peripheral extent, to facilitate its operative packing with respect to the cylinder wall surfaces. To accommodate pistons of this form, the cylinder wall surfaces in the opposite end zones 34 and 35 through which the respective pistons 26 and 27 oscillate, are semi-spherical. According to this arrangement, each piston is thus adapted for oscillation through a full half-turn or a 180 degree arc, as will be observed in particular from the view of Fig. 3. While any suitable piston packing means may be employed, in the present example each piston is provided with a groove 36 in its peripheral surface, to receive a half-circular packing ring 37 of suitable sealing material, and this ring may be biased into sealing contact with the cylinder surface by springs in the groove beneath the ring, one such spring being shown at 38 (Fig. 3) in each piston. A cylinder partition 39 between the piston shafts 28 and 29 and suitably rigidly supported by one of the cylinder shells 20, cooperates with the pistons 26 and 27 to divide the cylinder interior into separate combustion chambers 40 and 41, each of varying volume as determined by the operative positions of the pistons. Thus the cylinder unit being of double-acting character, combines in one the equivalent of two separate single acting cylinders with attendant space-saving and other advantages readily apparent. In order to seal the ends of the partition 39 relative to the adjacent piston shafts 28 and 29, suitable packing elements 42 may be employed, each being spring or otherwise urged into sealing contact with the adjacent piston shaft, as shown.

With particular reference to Fig. 4, the cylinder unit which by preference is adapted for four-cycle operation, has the central portion 43 of each cylinder shell 20 somewhat thickened or internally bossed as shown, and formed in the portion 43 are fuel inlet and exhaust passages 44 and 45 respectively, terminating in respective port openings 46 and 47 communicating with one of the combustion chambers 40 and 41. A valve 48 controls the fuel inlet port 46, and includes an actuating stem 49 extending to the exterior of the cylinder for actuation by a cam element 50 on a cam shaft 52. Similarly, a valve 53 controls the exhaust port 47, and has a stem 54 projecting exteriorly of the cylinder for actuation by an exhaust cam 55 on camshaft 52. Each of the valves is urged toward port-closing position by a suitable valve biasing spring 56. Bearing arms 57 on the cylinder shells 20, provide the operative support for the camshafts 52. As shown by Fig. 4, the camshaft 52 nearest the engine shaft 16, is driven therefrom by a gear 58 secured to the latter, enmeshing a pinion 59 on one end of the camshaft, the gear-ratio of the gear-pinion connection being selected so as to effect proper timing of valve operation by the cams 50 and 55, as for four-cycle operation of the engine. The opposite camshaft 52 may be driven synchronously with the camshaft 52 driven from the engine shaft 16, by an interconnecting drive 60 of bevel gear type, as illustrated. Connected to each of the fuel passages 44 is one end portion 62 of a fuel conduit 63, while similarly connected to each of the cylinder exhaust passages 45 is one end 64 of an exhaust discharge conduit 65, the fuel and exhaust conduit system for the entire engine being shown diagrammatically in Fig. 5. Ignition of the fuel charges in the cylinder may be effected by the usual igniting devices, such as a spark plug 66 (Fig. 4) associated with each of the cylinder combustion chambers 40 and 41.

It is to be observed that the cylinder bosses 43 which contain the valve ports and passages as above described, serve to reduce the initial volume of the combustion chambers to a desirable extent, such that higher compression and combustion pressures may be thereby attained. The initial volume reducing function thereof is clearly illustrated in Fig. 3 in respect to the cylinder unit 11 at the top of the figure. In this connection, it may be noted here that the cylinder partition 39 may be considerably increased in thickness to effect a further decrease in the initial combustion space volume, or the partition 39 of suitable thickness, may be relied on entirely for this purpose, with the internal projection of the bosses 43 reduced to a minimum.

Figure 5:
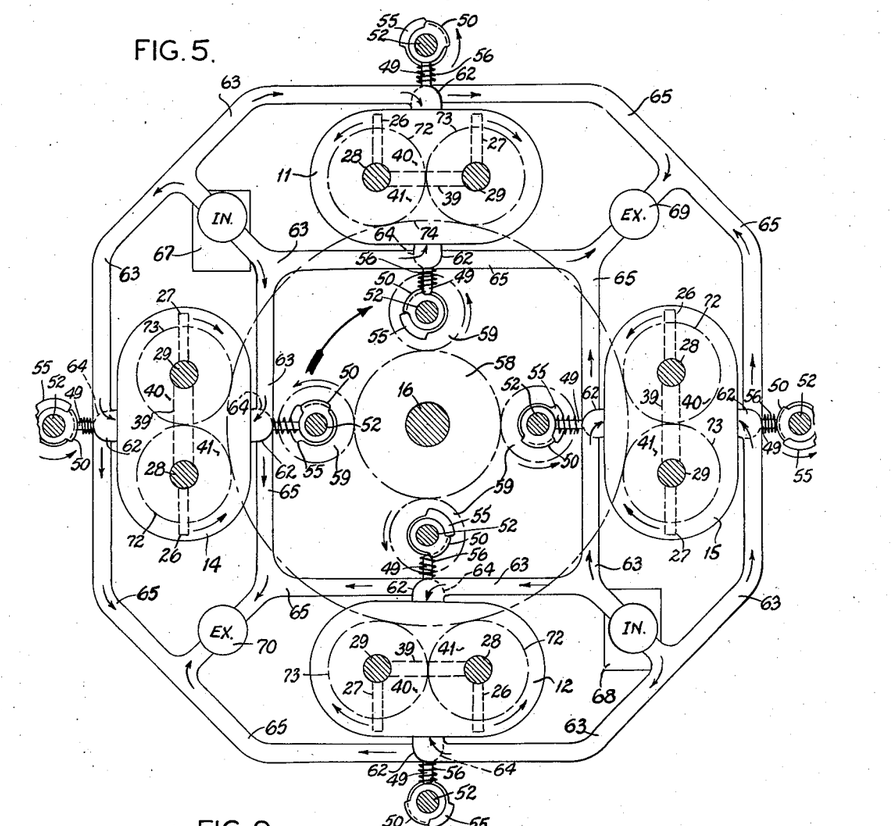
Fig. 5 is a diagrammatic view of the engine in end elevation, illustrating the fuel and exhaust conduits and valve actuating cam system thereof.

With reference now to Fig. 5, this view illustrates diagrammatically, a suitable fuel and exhaust conduit system for the several engine cylinder units, as well as the common drive arrangement for the camshafts of the units. As there shown, the cylinder units 11 and 14 are supplied with fuel from a carburetor assembly 67 of any suitable or well-known form, feeding fuel charges to the cylinder fuel passages through the branch conduits 63. The remaining cylinder units 12 and 15 are supplied in like manner through branch conduits 63 from a carburetor assembly 68. The exhaust gases from the cylinder units 11 and 15 are conducted through the exhaust conduit branches 65 to a manifold duct 69 leading to a point of exhaust discharge, while the other cylinder units 12 and 14 exhaust through like branch conduits 65 and a manifold duct 70. With respect to the valve camshaft system, it will appear that the gear 58 on engine shaft 16 serves as a common drive for the inner or adjacent camshafts 52 of the cylinder units, as through the camshaft pinions 59. Operation of the more remote camshaft 52 in each cylinder unit, is effected from the inner camshaft by a suitable drive 60, as hereinbefore indicated. Thus from this diagrammatic view, and from the structural views of Figs. 1, 2 and 3, it will appear that a relatively compact assembly is effected with a desirable symmetrical arrangement of the engine cylinders and described adjunctive parts, about the engine power shaft 16.

Figure 1:
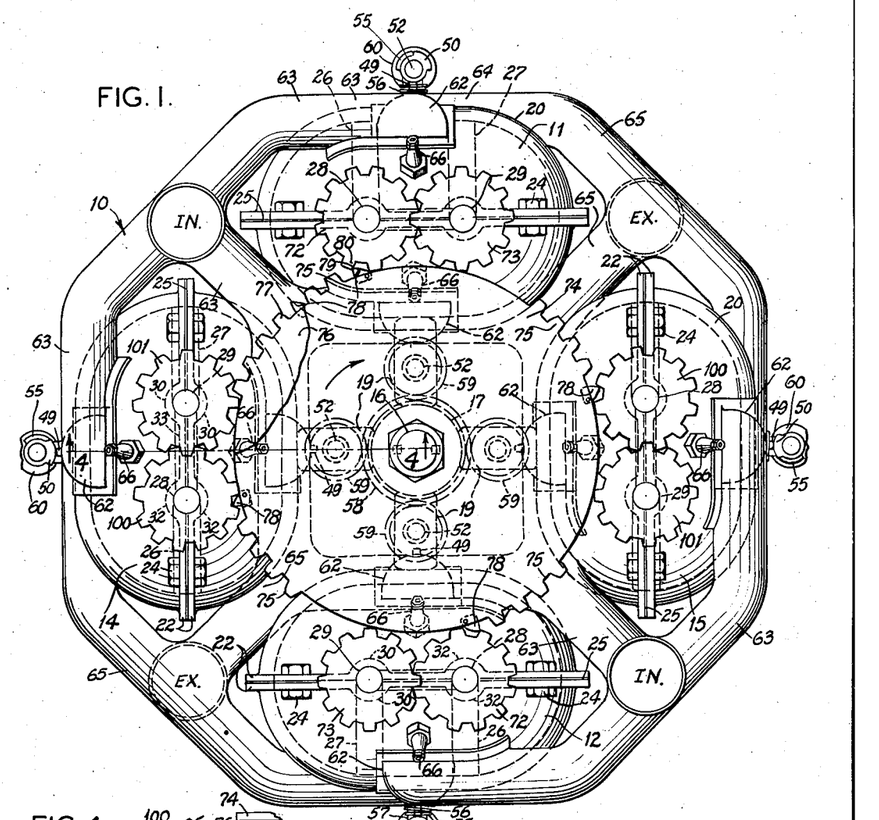
Fig. 1 is a view in elevation of one end of the engine, illustrating the novel gearing interconnecting the engine shaft and cylinder units.
Figures 2, 6:
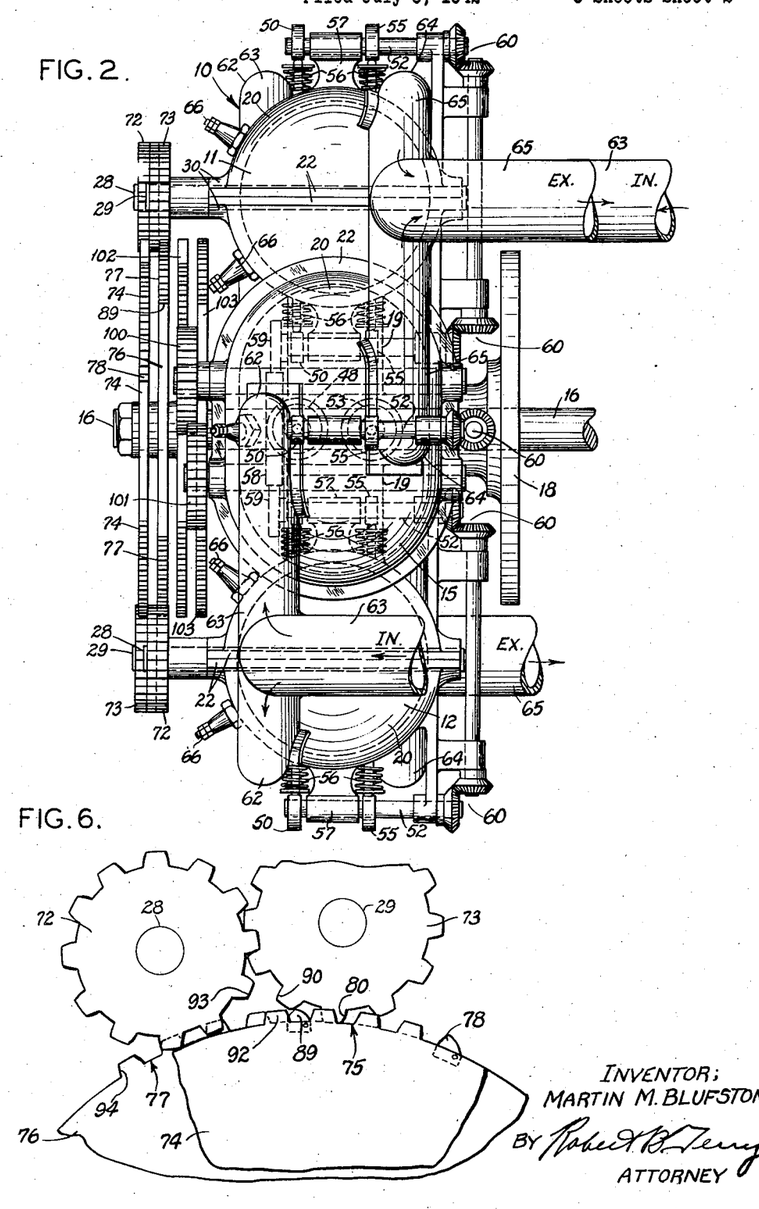
Fig. 2 is a side elevation of the engine.
Fig. 6 is an enlarged fragmentary view of the novel gear mechanism as employed to interconnect the oscillating pistons of each cylinder unit to the engine shaft.

Turning now to the novel gear mechanism for interconnecting the pistons and engine shaft so as to translate the oscillating movements of the former to a continuous unidirectional rotary movement of the latter, reference is directed to the disclosure thereof in Figs. 1, 2 and 6. Describing first the operative connection of the diametrically opposed pair of cylinder units 11 and 12 to the engine shaft 16, each of these units has a pinion 72 keyed or otherwise secured on the projecting end of the piston shaft 28, and a like pinion 73 similarly secured on the projecting end of the other piston shaft 29. As appears from Fig. 2 in particular, the pinions 72 and 73 which are relatively wide, are axially offset substantially to the extent of one-half the width of each, and the aligned portions thereof are in full engagement as shown in Fig. 1. The tooth form and enmeshing relationship thereof is, by preference, such as to minimize or substantially preclude any lost-motion or back-lash movement of the pinions, whereby to assure equal and synchronous oscillating movements of the pistons 26 and 27.

According to the present invention, unidirectional rotation of the engine shaft 16, say in the clockwise direction as viewed from Fig. 1, is attained from the oscillatory movements of the pistons 26 and 27, so that in the present example, only the counterclockwise movements of the pinions 72 and 73 are utilized to drive the shaft. To this end, a gear 74 suitably secured to engine shaft 16, is arranged thereon so as to be disposed in a plane to one side of the plane of engagement of pinions 72 and 73, for engagement solely with the free portion of the pinion 72. The gear 74 as shown by Fig. 1 is of incomplete or mutilated character, to provide as in the present example, four equally spaced tooth sectors 75, the gear thus being adapted for intermittent engagement with pinion 72. A like incomplete gear 76 is similarly secured to the shaft 16, and is positioned to one side of the plane of pinion engagement for intermittent engagement of its tooth sectors 77 solely with the free portion of pinion 73. The pinions 72 and 73 oscillate through a half-turn, since in the present example, the piston vanes 26 and 27 oscillate through 180 degrees, and hence the present gear-pinion arrangement is such that during the counterclockwise half-turn of each pinion (as viewed in Fig. 1), it engages one of the tooth sectors on the associated gear to drive the gear and engine shaft in the clockwise direction.

Figure 7:
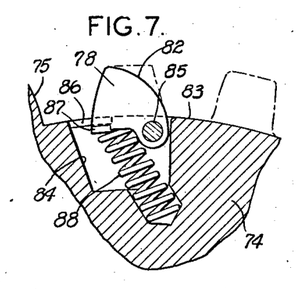
Figs. 7 and 8 illustrate in side and end elevations respectively, the form and gear mounting arrangement of the lead tooth in each gear sector of the gears on the engine shaft.
Figure 8:
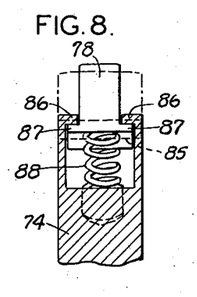

The gear 74 being provided with four equally spaced tooth sectors 75 as presently preferred, has each sector formed within an arc of 45 degrees at the gear periphery, the sectors in each case having a plurality of teeth less in number than one-half the number of teeth on the associated pinion 72. The sector arrangement further is such that the lead tooth 78 of one sector is angularly spaced by 90 degrees from the corresponding lead teeth of the adjacent sectors, this being effected in order to assure engagement between the pinion 72 and a gear sector in each quarter-turn of the gear 74. As will be observed from Fig. 1 in particular, the gear 74 is operatively related to pinion 72 such that as the piston vane 26 rotating clockwise, attains its top dead center position as shown in broken lines, the lead tooth 78 of one gear sector 75 has the upper portion of its rear face 79 positioned for immediate engagement by a tooth 80 on pinion 72, this upon counter-clockwise rotation of the pinion in response to reversed or counter-clockwise movement of the vane 26. Since just prior to the attainment of the indicated gear-pinion relation, the pinion was rotating oppositely to the clockwise rotation of the gear 74, the pinion tooth 80 must move over the gear sector lead tooth 78 to the position shown. In order to effect this result, the lead tooth 78 is constructed and assembled to the gear 74 so as to be retractible in response to abutment by the pinion tooth 80. Accordingly, and as illustrated by Figs. 7 and 8, the tooth 78 has its forward face 82 inclined toward the blank periphery 83 of the gear, and is received in a gear pocket or recess 84, for pivotal movement about a pin 85 arranged transversely of the gear. Inwardly opposed flanges 86 at the outer end of the recess 84 cooperate with projecting flanges 87 at the base of the tooth 78 to limit the outward extension of the tooth, while a suitable spring 88 in the bottom of the recess 84 and bearing against the tooth, serves to urge the tooth outwardly of its recess. As will be now observed, the pinion tooth 80 in moving clockwise over the gear tooth 78, will engage the inclined surface 82 of the latter, to cam the tooth downwardly in its recess 84. When the pinion tooth 80 clears the tooth 78, the gear tooth under the influence of its spring 88, will immediately pivot upwardly as by a snap-movement, into position for driven engagement with the pinion tooth. The tension of spring 88 is selected so that it will effectively oppose any retraction of tooth 78 upon driving contact of pinion tooth 80 with the gear tooth. The lead tooth 78 of each of the gear sectors 75 on gear 74 is thus adapted for retracting movement, to assure a positive driven engagement thereof with the pinion tooth 80 when the latter is reversed to rotate counter-clockwise. For the same reason, the lead tooth 89 of each gear sector 77 on gear 76, is similarly constructed for retracting displacement in its operative association with the pinion 73.

As will be observed from Figs. 1 and 2, the gears 74 and 76 are relatively angularly displaced such that the sectors 77 of gear 76 lag the sectors 75 of gear 74 by a predetermined degree, this provision being effected together with the formation of each of the gear sectors 75 and 77 within an arcuate extent of 45 degrees and each with less than one-half the number of teeth on the associated pinion, so that during clockwise rotation of the gears, the pinion 73 rotating clockwise while pinion 72 rotates counterclockwise, will be free of engagement with a sector 77 on gear 76, while the pinion 72 enmeshes a sector 75 on gear 74. Conversely, this arrangement serves to free pinion 72 from the gear 74 while the pinion 73 rotating counterclockwise, is in driving engagement with a sector 77 on gear 76.

In the operation of the drive connection thus far described, and considering for the present the cylinder unit 11 in Fig. 1, wherein the pistons 26 and 27 are in their upper extreme positions as indicated, the gear 74 is initially related to the pinion 72 such that the leading tooth 78 of one of the gear sectors 75 has its rear face 79 opposed to and substantially in contact with the pinion tooth 80, as clearly shown in Fig. 1. Now upon firing of a fuel charge in the combustion chamber between the pistons 26 and 27, the pistons will be thereby rotatably displaced to the opposite extreme of their pivotal or oscillatory movement, to produce counterclockwise rotation of pinion 72 and a corresponding clockwise rotation of the pinion 73. The counterclockwise rotation of pinion 72 thus will effect a clockwise rotation of gear 74 through the sector 75 thereof in engagement with pinion 72, and hence a corresponding rotation of engine shaft 16. During the above described drive of the gear 74 by pinion 72, the companion pinion 73 idles with respect to its associated gear 76, this being permitted by the lag arrangement of the sectors 77 on gear 76 relative to the sectors 75 on gear 74, wherein the angular extent of the lag is predetermined for a given gear assembly, so that engagement between a sector 77 and pinion 73 cannot occur while the pinion is rotating clockwise. Conversely, the lead thus provided for the sectors 75 of gear 74, serves similarly to prevent engagement of a sector 75 with pinion 72 while it is rotating clockwise during counterclockwise rotation of pinion 73 in driving engagement with a sector 77 on gear 76. The foregoing result is assured by forming the tooth sectors 75 and 77 such that each covers less than an arc of 45 degrees at the gear periphery, to an extent such that for example, when the lead tooth of a sector on gear 74 attains a driven engagement with the actuating pinion 72, the last or trailing tooth of the adjacent sector 77 on gear 76 (which has been in driven engagement with the pinion 73) is free of the pinion 73.

With reference to Fig. 6 which presents an example of the foregoing conditions of gear-pinion operation, the gears 74—76 and pinions 72—73 are shown in an operative relation existing when the pistons 26 and 27 fully attain their lower extreme positions in cylinder unit 11 (opposite to the positions thereof indicated in dotted outline in Fig. 1). As there shown, the leading tooth 89 of one sector 77 on gear 76 is in position to be engaged by a tooth 90 on pinion 73, upon counterclockwise rotation of the pinion. At the same time, the trailing tooth 92 of the adjacent sector 75 on gear 74, has its rear or trailing face substantially clear of contact with the nearest tooth 93 on pinion 72. Now upon reversal of piston movement, as to produce counterclockwise rotation of pinion 73 and clockwise rotation of pinion 72, pinion 73 will engage the sector 77 of gear 76 to drive the gear and hence the engine shaft in the clockwise direction. As this occurs and since gear 74 moves with gear 76, the trailing tooth 92 on sector 75 of the gear 74 will be displaced clockwise away from the zone of tooth 93 on pinion 72, so that pinion 72 which is now rotated clockwise, and the sector of gear 74 are fully disengaged. The pinion 72 thus idles with respect to its gear 74. As the pinion 73 continues in its counterclockwise half-turn, it drives the engine shaft through the sector 77 of gear 76 engaged thereby. However, since the sector 77 has fewer teeth than one-half the number on pinion 73, and further, is formed over less than a 45 degree arc at the gear periphery as before indicated, the pinion will not drive the gear 76 through a full angular extent of 45 degrees or one-eighth of a turn, as is required to bring the lead tooth 78 of a sector 75 on gear 74 into driven position with respect to the tooth 80 on pinion 72 (Fig. 1). This result is clearly observable from Fig. 6, since as the pinion 73 approaches and attains the end of its counterclockwise half-rotation, the trailing tooth 94 of the engaged sector 77 must be advanced clockwise beyond the range of pinion engagement, so as to be free of the pinion 73 when the latter is reversed. Thus in order to complete rotation of gear 76 and hence the gear 74, to bring the lead tooth 78 of a sector 75 on gear 74 into driven engagement with tooth 80 on pinion 72, the cylinder units 14 and 15 are arranged so that one pinion of each is in full driving engagement with one gear of the set associated with these units as the pinion 73 approaches the end of its counterclockwise rotation. The units 14 and 15 and the operative connection thereof to the engine shaft 16 will be presently described.

The foregoing described cycle of pinion-gear engagement is continuous throughout engine operation, so that the oscillations of the pistons 26 and 27 are thereby translated to unidirectional rotation of the engine shaft 16. Moreover, the cylinder unit 12 in diametrical opposition to unit 11, operates the gears 74 and 76 exactly as described for the latter unit, so that these cylinder units have a common operative connection to the shaft 16. Also, the firing cycles of the units 11 and 12 are by preference, synchronized, in order to balance the torque applied thereby to the gears 74 and 76, as this will be appreciated.

The cylinder units 14 and 15 each having enmeshing piston pinions 100 and 101 corresponding to pinions 72 and 73, are operatively connected to shaft 16 by a set of incomplete gears 102 and 103 secured to the shaft, these gears in form and operative relation to the pinions 100 and 101, being identical with the gears 74 and 76. Although the pistons of the units 14 and 15 may be positioned so as to have any desired, but appreciable out-of-phase relationship with the pistons of the units 11 and 12, according to the present exemplary disclosure, they are displaced relative to the latter pistons so as to effect a 90 degree out-of-phase relationship therewith, as this is clearly shown by Fig. 3. The effect of such phase relationship between the paired cylinder units is to assure at all times, an operative engagement of the pinions of one pair of cylinder units with the associated engine shaft gears, as for the purpose heretofore indicated. Also, the firing cycles of the units 14 and 15 are out-of-phase with such cycles of the units 11 and 12 preferably by a corresponding degree, this being effected in order to obtain a desirable spread of the power impulses transmitted to the engine shaft in each four-cycle operation of the cylinders. It is to be noted additionally, that the four gears 74, 76, 102 and 103 function collectively as a flywheel, to render smoother engine operation according to the usual function of such element.

Figure 9:
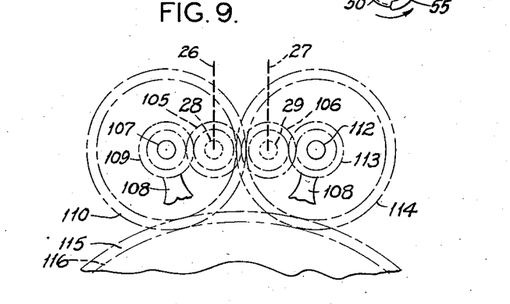
Fig. 9 discloses somewhat diagrammatically, a modification in the piston drive arrangement adapted for use with cylinder units wherein the pistons oscillate about axes having a minimum relative spacing.

A modified piston-engine shaft drive connection is illustrated somewhat diagrammatically by Fig. 9, this drive being adapted for use with cylinder units of the form and construction herein described, wherein the relative spacing of the piston shafts 28 and 29 is considerably reduced over the spacing thereof shown by Figs. 1 and 3. One result of so limiting the spacing of the piston axes is to effect a small or minimum initial volume of the combustion chamber between the pistons 26 and 27 when in either of their opposite extremes of oscillating movement, and hence to produce thereby higher compression and combustion pressures in the cylinder unit. With reference to Fig. 9, pinions 105 and 106 are secured respectively to the projecting ends of the piston shafts 28 and 29. A stub shaft 107 supported by a frame member 108, has a pinion 109 on one end of the shaft arranged for constant mesh with the pinion 105, and has secured to its opposite end a larger pinion 110. Similarly, a second stub shaft 112 on frame member 108, is provided with a pinion 113 in mesh with the pinion 106, and a larger pinion 114 in constant mesh with the pinion 110. The pinions 105, 106, 109 and 113 are identical, so as to effect a unit ratio of drive between the piston shafts 28—29 and the stub shafts 107—112, while the larger pinions 110 and 114 preferably are identical in character to the pinions 72 and 73 heretofore described. The incomplete gears 115 and 116 on engine shaft 16, arranged for driven engagement with the pinions 110 and 114 respectively, correspond in form and relatively displaced position to the gears 74 and 76 associated with pinions 72 and 73, the only difference being that the gear 116 associated with pinion 114 leads the gear 115 as is obviously necessary in this modified drive.

It will be appreciated that by lengthening the main engine shaft 16, one or more additional cylinder organizations of the character and arrangement herein disclosed, may be coupled to the shaft. In such case, the cylinder units of one assembly may be adapted for out-of-phase operation with respect to the units of another assembly, so as to increase the number of successive power impulses applied to the engine shaft in each revolution thereof.

Figure 10:
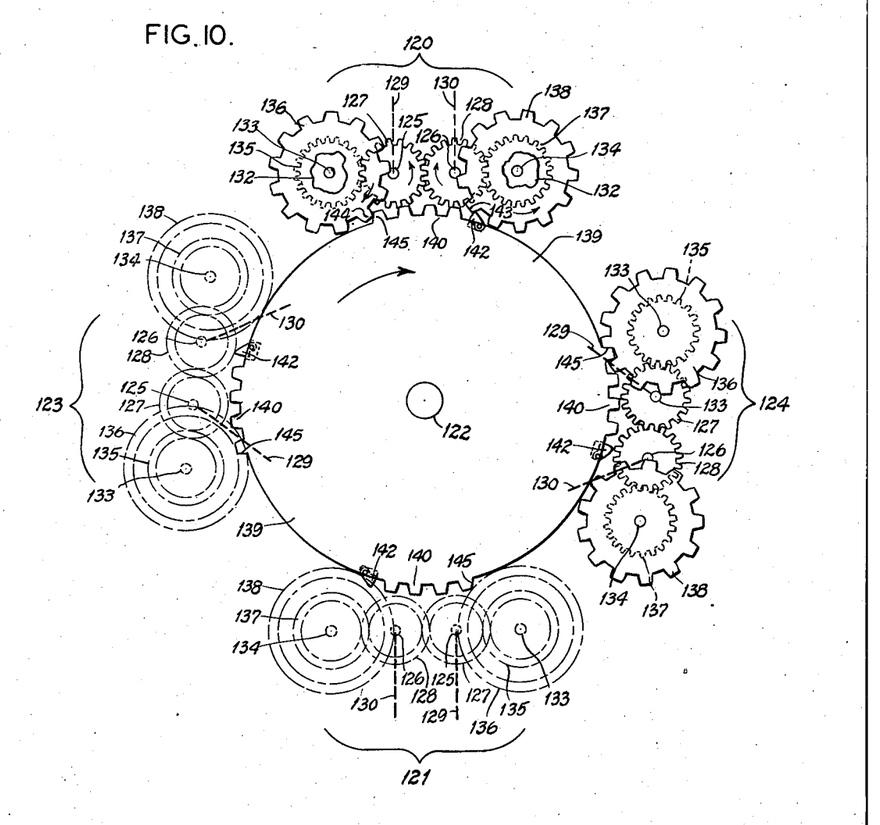
Fig. 10 illustrates diagrammatically, a modified piston-engine shaft drive mechanism effected according to the present invention.

With reference now to Fig. 10 which illustrates somewhat diagrammatically, a piston-engine shaft drive arrangement of a further modified character, there are provided a pair of cylinder units 120 and 121 in diametral opposition relative to engine shaft 122, and a like pair of cylinder units 123 and 124 also in diametral opposition with respect to the shaft 122, the latter pair however being angularly shifted relative to the first pair by an angular extent amounting to less than 90 degrees, this for a purpose which will appear presently. Apart from the drive assembly, these cylinder units may correspond in all respects with the exception of the relative spacing of the piston shafts, to the units 11, 12, 14 and 15 heretofore described. Projecting from the cylinder casing of unit 120, are the ends of the piston shafts 125 and 126, and secured on these shafts' ends are like pinions 127 and 128 which are in constant mesh in order to maintain synchronous oscillation of the piston 129 and 130, the latter being shown in outline only as positioned in their upper extreme of oscillating movement within the cylinder. These pistons are shown relatively closely spaced, as in the embodiment illustrated by Fig. 9, which thereby attains a desirable minimum initial combustion space between the pistons.

Supported by a frame portion 132 of the engine frame (not shown), are spaced stub shafts 133 and 134, each equidistant radially from the engine shaft 122. Carried by the stub shaft 133 is a pinion 135, which enmeshes the piston pinion 127, while a somewhat larger pinion 136 is likewise arranged on the shaft. The pinions 135 and 136 may be separate elements suitably secured together or to the stub shaft for conjoint rotation, or as presently preferred, these may be formed as a unitary double-pinion structure, in which case it may be freely rotatable on the stub shaft with the latter fixed in the frame 132. A like unitary pinion assembly is supported by the other stub shaft 134, to provide a pinion 137 in mesh with the piston pinion 128, and a larger pinion 138.

According to the modified embodiment, the large pinions 136 and 138 are disposed in a common plane normal to the engine shaft 122, for alternate driving engagement with a single incomplete or mutilated gear 139 secured upon the shaft 122. The gear 139 is formed to provide as in the present example, four equally spaced tooth sectors 140 wherein each sector is confined to an arcuate extent of less than 45 degrees at the gear periphery for a purpose which will appear. The lead tooth 142 of each sector (the unidirectional rotation of the gear 139 and shaft being clockwise as indicated by the arrow in Fig. 10) is of a retractible character in order to effect initial driven engagement thereof with the pinions 136 and 138, and for present purposes, the construction of each lead tooth may be similar to that provided for the lead teeth 78 on the gear 74, as heretofore described and illustrated by Figs. 7 and 8.

With the gear 139 and piston-pinion assembly of cylinder unit 120 related as shown in Fig. 10, as the pistons 129 and 130 approach and attain their upper or top dead-center positions shown in broken lines, the right-hand large pinion 138 driven through the pinion set 128—137, attains one extreme of its rotary movement, following clockwise rotation thereof. At the same time the gear 139 rotating clockwise assumes the position shown, wherein the lead tooth 142 of one gear sector 140 is in engagement with a tooth 143 on pinion 138, this being permitted by reason of the retractible nature of the lead tooth which allows the tooth to be displaced by the pinion tooth 143 as the latter moves over the gear tooth. The left hand pinion 136 in rotating counterclockwise (through the pinion set 127—135 and piston 129 in moving outwardly to its outer extreme position as shown), has been in full driving engagement with the particular gear sector above indicated, and in the position of the parts shown in Fig. 10 which obtains at the instant of reversal of pinion 136, a pinion tooth 144 has its tip substantially in contact with the opposed tip of the trailing tooth 145 of the gear sector. Thus the gear sector shown is between and in contact with the driving pinions 136 and 138. Now upon reversal of the pistons 129 and 130, the pinion 138 will be caused to rotate counterclockwise to engage the sector 140 and drive the gear and engine shaft in the clockwise direction, while the pinion 136 is thereby rotated in the clockwise direction in an idling manner, since it is free of tooth engagement with any sector on gear 139. This last results from the fact that the gear sector 140 in moving clockwise, has its trailing tooth 145 displaced away from the pinion so that tooth interference cannot occur.

Following reversal of the pistons 129 and 130, the pinion 138 drives the gear 139 through the sector 140 thereof, until the pistons reach the opposite or inner extreme of their oscillatory movement. At such time, the pinion 138 and gear sector 140 will be related exactly as above described for the pinion 136 and sector 140 as shown in Fig. 10, so that the trailing tooth 145 of the sector has its trailing tip in contact with the tip of the adjacent tooth on the pinion. Since according to the present example, the pistons preferably oscillate through a half-turn or 180 degrees, the pinion 138 must rotate through an angle greater than 180 degrees in order to actuate the gear sector 140 engaged thereby, from the initial position illustrated in Fig. 10 to a position as above described. Hence to attain this result, the gear ratio of the meshing pinions 128—137 is selected so as to provide for the necessary greater rotation of the pinion 138. A like gear ratio is effected for the pinion set 127—135 to produce greater than 180 degree movement of the drive pinion 136, since the latter in each counterclockwise rotation thereof actuates the gear 139 through one of its sectors 140, exactly as described for the pinion 138.

Each of the remaining cylinder units 121, 123 and 124 has a gear-actuating pinion assembly which is substantially identical to that herein-above described in connection with the cylinder unit 120, and hence the corresponding elements thereof may bear the same reference characters, as indicated in Fig. 10. The units 120 and 121 being in diametral opposition, are related for simultaneous driving engagement with the gear 139 in each counterclockwise rotation of the corresponding pinions 136—138 thereof, while the units 123 and 124 also in diametral opposition, are similarly related for conjoint actuation of gear 139. The latter units however, are displaced or angularly offset from the paired units 120—121 by less than 90 degrees, as clearly illustrated in Fig. 10, this arrangement being effected in order to assure a full driving engagement between these units and the gear 139 when one or the other corresponding pair of drive pinions 136—138 of units 120—121 have completed their drive engagement with the gear, and conversely with respect to the units 123 and 124.

The modified drive assembly as now described, provides but a single driven gear 139 common to all of the cylinder units, and the arrangement is such that one pair of cylinder units is in full driving association with the gear at any given time. It is to be noted that the gear 139 may well serve as a flywheel to effect smooth engine operation, while the firing order of the double-acting cylinder units may be selected so as to produce relatively evenly distributed power impulses with respect to the gear 139. Also, it will be readily appreciated that more than one cylinder and engine shaft drive organization as illustrated by Fig. 10, may be related to a common engine shaft to effect engines of varying capacities. Thus the present improvements are particularly advantageous to the manufacturer of unit-type engines wherein engine units may be added or removed as desired.

While the present description relates principally to preferred embodiments of the invention as herein illustrated, it will be appreciated that alterations and further modifications may be effected without departing from the spirit and full intended scope of the invention, as defined by the appended claims.

I claim:

1. A mechanism of the character described adapted for an internal combustion engine of oscillating piston type and of a character providing a pair of oppositely oscillating pistons in a cylinder, and an engine shaft spaced therefrom, the mechanism being provided for translating the oscillating movements of the pistons to a unidirectional rotary movement of the engine shaft, and including a pair of pinions arranged for synchronous and opposite oscillation from the oscillating engine pistons, the pinions further being arranged such that their oscillation axes are relatively angularly spaced about the engine shaft axis as a center, by substantially less than a right angle, and gear means provided for mounting on the engine shaft for shaft-rotating coaction with said pinions, said gear means being of mutilated gear-tooth character providing spaced sets of gear teeth, adapted for alternate driven engagement with said pinions a plurality of times in each complete revolution of the gear means, the sets of gear teeth on said gear means each having the lead tooth thereof formed separately of the gear means, and means mounting each lead tooth on the gear means to permit tooth-retraction inwardly of the gear periphery, as for the purpose described.

2. A mechanism of the character described adapted for an internal combustion engine of oscillating piston type and of a character providing a pair of oppositely oscillating pistons in a cylinder, and an engine shaft spaced therefrom, the mechanism being provided for translating the oscillating movements of the engine pistons to a continuous, unidirectional rotary movement of the engine shaft, and comprising a pair of pinions each oscillatable by one of the engine pistons, and arranged in lapped engagement such that a portion of each pinion is free of tooth engagement with the other pinion, and a pair of gear elements adapted for engine shaft mounting in a position thereon for operative engagement of each gear element with the free portion of one of said pinions, said gear elements each being of a mutilated character providing a plurality of sets of teeth thereon, and being relatively angularly arranged such that each operatively engages its pinion alternately with engagement of the other with its pinion, the gear elements engaging the pinion in said alternate manner a plurality of times in each complete revolution of the engine shaft.

3. A mechanism of the character described adapted for an internal combustion engine of oscillating piston type and of a character providing a pair of oppositely oscillating pistons in a cylinder, and an engine shaft spaced therefrom, the mechanism comprising a pair of pinions each oscillatable by one of the engine pistons, said pinions being arranged in lapped engagement such that a portion of each pinion is free of tooth engagement with the other pinion, and a pair of gear elements adapted for securement upon the engine shaft, said gear elements being positioned thereon relative to said pinions such that each gear element is disposed for operative engagement with the free portion of one of said pinions, and each of said gear elements further being adapted for intermittent operative engagement with its pinion.

4. A mechanism of the character described adapted for an internal combustion engine of oscillating piston type and of a character providing a pair of oppositely oscillating pistons in a cylinder, and an engine shaft spaced therefrom, the mechanism being provided for translating the oscillating movements of the pistons to a unidirectional rotary movement of the engine shaft, and comprising a pair of pinions each oscillatable by one of the engine pistons, said pinions being arranged in lapped engagement such that a portion of each pinion is free of tooth engagement with the other pinion, and a pair of gear elements adapted for securement upon said engine shaft in a position thereon for operative engagement of each gear element with the free portion of one of said pinions, said gear elements being of a mutilated character and relatively arranged such that each operatively engages its pinion alternately with engagement of the other with its pinion.

5. A mechanism of the character described adapted for an internal combustion engine of oscillating piston type and of a character providing a pair of oppositely oscillating pistons in a cylinder, and an engine shaft spaced therefrom, the mechanism being provided for translating the oscillating movements of the pistons to a unidirectional rotary movement of the engine shaft, and comprising relatively spaced pinions arranged in a common plane, means including relatively enmeshing gear members interconnecting said pinions, actuated by said oppositely oscillating pistons for effecting correspondingly opposite oscillation of said pinions, and a single gear element adapted for securement upon the engine shaft, said gear element being disposed in the plane of said pinions and being of a mutilated character adapting the same for alternate driven engagement with said pinions.

6. A mechanism of the character described adapted for an internal combustion engine of oscillating piston type and of a character providing a pair of oppositely oscillating pistons in a cylinder, and an engine shaft spaced therefrom, the mechanism being provided for translating the oscillating movements of the pistons to a unidirectional rotary movement of the engine shaft, and comprising a pair of pinions each oscillatable by one of the engine pistons, said pinions being arranged in lapped engagement such that a portion of each pinion is free of tooth engagement with the other pinion, a pair of gears adapted for securement upon said engine shaft in a position thereon for operative engagement of each with the free portion of one of said pinions, said gears each being of a mutilated character, providing equally peripherally spaced sets of gear teeth, the lead tooth of each set on each of the gears being formed separately of the gear, and means mounting each lead tooth on the gear to permit tooth retraction inwardly of the gear periphery, as for the purpose described, the gears being relatively arranged on the engine shaft such that each operatively engages its associated pinion alternately with engagement of the other with its pinion.

MARTIN M. BLUFSTON.